(12) United States Patent
Mothfar

(10) Patent No.: US 8,899,601 B1
(45) Date of Patent: Dec. 2, 2014

(54) MOTOR VEHICLE HAVING ANTI-ROLLOVER DEVICE

(71) Applicant: Ahmad Younis Mothfar, Al Salem (KW)

(72) Inventor: Ahmad Younis Mothfar, Al Salem (KW)

( * ) Notice: Subject to any disclaimer, the term of this patent is extended or adjusted under 35 U.S.C. 154(b) by 0 days.

(21) Appl. No.: 14/340,929

(22) Filed: Jul. 25, 2014

(51) Int. Cl.
  *B60G 21/05* (2006.01)

(52) U.S. Cl.
  USPC .................................... 280/124.106

(58) Field of Classification Search
  USPC ............... 180/89.15, 65.1, 65.51, 65.6, 65.8; 280/124.103, 124.106, 124.107, 5.502, 280/5.506, 5.507, 5.509
  See application file for complete search history.

(56) References Cited

U.S. PATENT DOCUMENTS

| | | | |
|---|---|---|---|
| 2,110,809 A | 3/1938 | Murphy | |
| 2,286,575 A * | 6/1942 | Ronning | 180/363 |
| 3,008,729 A | 11/1961 | Muller et al. | |
| 4,660,853 A | 4/1987 | Jephcott | |
| 7,017,685 B2 * | 3/2006 | Schoenberg | 180/2.1 |
| 8,262,101 B2 | 9/2012 | Madler et al. | |
| 2013/0214503 A1 * | 8/2013 | Chiuppani | 280/124.103 |

* cited by examiner

*Primary Examiner* — Faye M. Fleming
(74) *Attorney, Agent, or Firm* — Lowe Hauptman & Ham LLP

(57) ABSTRACT

An anti-rollover and driver and passenger side force prevention device for a motor vehicle including a plurality of three or four wheels including a one, pair or all of driven wheels that are driven by the motor connected to transmission. A main frame and springs supports the main frame above the wheels. A pair of rotatable hubs aligned along a longitudinally extending axis with one of the hubs disposed in a forward portion of the frame and the second hub disposed in an aft part of the frame. The vehicle includes an electronic control system and a servo-motor disposed on the main frame. An upper frame which is above the lower frame and rotates or tilt to the right or left when the vehicle makes a relatively sharp turn to the right or left.

A mechanic/electronic controlled safety system to biases and locks tilting frame to zero degree rotation or tilt in case of fail of electronic controlled servo-motor system.

7 Claims, 4 Drawing Sheets

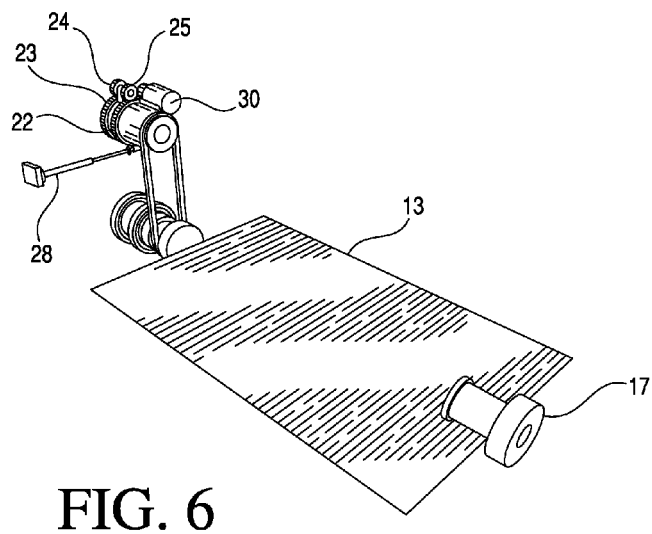
FIG. 6
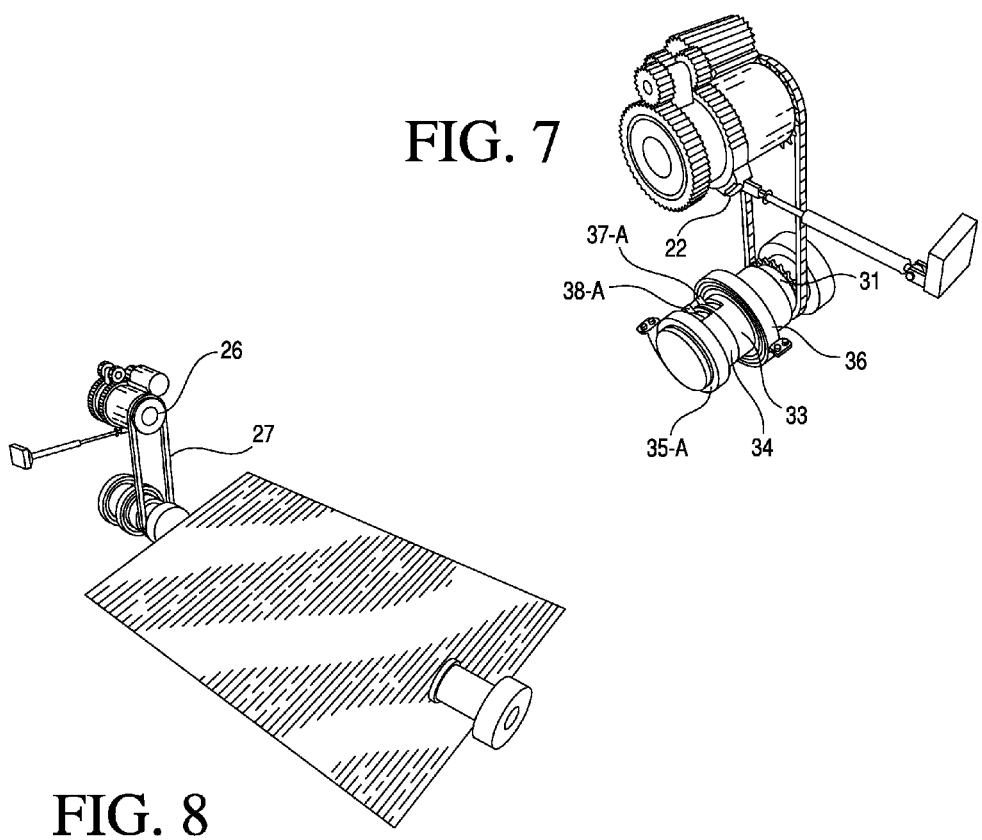
FIG. 7
FIG. 8

MOTOR VEHICLE HAVING ANTI-ROLLOVER DEVICE

FIELD OF THE INVENTION

This invention relates to a motor vehicle having an anti-rollover device and more particularly to a motor vehicle and device that reduces the likelihood of a rollover as a result of attempting a turn at an excessive rate of speed.

BACKGROUND OF THE INVENTION

Motor vehicles with rollover prevention devices are well known and have been in use for many years. For example, an early U.S. Patent of Murphy U.S. Pat. No. 2,110,809 that issued in 1938 discloses a Balancer to prevent tilting of a motor vehicle when speeding around curves. As disclosed, the system uses a pendulum to prevent tilting by operating a control valve to adjust fluid supports.

A more recent U.S. Pat. No. 4,660,853 of Jephcott discloses a vehicle body tilting mechanism or system that is responsive to lateral acceleration of the vehicle and to steering movements. The mechanism includes a tilt actuator means and a tilt control means governed by a gravity-sensitive device and a device responsive to steering movement. The system maintains the vehicle body substantially in line with the resultant vector of gravity and centripetal acceleration while cornering. The steering input accelerates the response of the mechanism to changes of direction of the vehicle.

Finally, a U.S. Patent of Madler et al. U.S. Pat. No. 8,262,101 discloses a modular rough terrain vehicle. As disclosed the vehicle includes an elongated main frame for supporting a self-contained v-haul body, first and second forwardly-extending frame arms located on opposite sides of the main frame. Third and fourth rearwardly-extending frame arms located on opposite sides of the main frame with each arm having a wheel mounted thereon. Also included are first and second cross members pivotably connected to the arms and configured to enable the main frame and the frame arms to pivot about a lengthwise axis of the main frame. First and second length-adjustable members operatively connected to the first frame arm and the third frame arm and the second frame arm and the fourth frame arm, respectively. Selective movement of each length-adjustable member causes the associated arm to move up or down and a level detector for producing and applying leveling signals to each of the length-adjustable members to maintain the elongated main frame in a relatively level orientation when the vehicle encounters uneven terrain.

Notwithstanding the above, it is presently believed that there is a need and a potential commercial market for an improved motor vehicle having an anti-rollover device. There should be a market for such vehicles because they reduce the likelihood of a rollover as a result of attempting a turn at an excessive rate of speed. Such vehicles are now quite popular and are referred to as four wheel off-road devices.

SUMMARY OF THE INVENTION

In essence, a motor vehicle having an anti-rollover device in accordance with the present invention includes a motor, a plurality of wheels including a pair of driven wheels that are driven by the motor. A longitudinally extending main frame and a plurality of springs support the main frame above the wheels. The main frame also incorporates a pair of rotatable hubs aligned along a central longitudinally extending axis with one of the rotatable hubs disposed in a forward part of the main frame and the second of the rotatable hubs disposed in an aft part of the main frame. The vehicle may include an electronic control system, a plurality of sensors to sense braking, steering position, speed, angle of tilt and centrifugal force.

In essence, the invention works through a system that connects the main chassis which contains the suspension, wheels and engine and a rotatable tilting frame or floor plate which contains a driver's seat and the control devices for the vehicle. Based on the G-force the system rotates or tilts the tilting frame about the central longitudinal axis to correct for the side pulling force on the driver. The system is moved by a high-torque servo motor connected to a control unit and it determines the degree of tilting by a group of sensors as for example a g-sensor while cornering at relatively high speeds for the conditions.

When it fails the system can be supplied by a FAIL-SAFE system that returns the tilting frame to a zero angle where it stays in a locked position until it is repaired. The system will use electronically controlled shock absorber to not immediately go back to a zero angle until the vehicle completes the turn and returns to a straight line. At this time, a warning indicator will light.

The electronic control system is constructed and arranged to tilt or rotate a tiltable frame about the central longitudinal axis to the right (in a clockwise direction) in response to a right hand turn and to the left (in a counterclockwise direction) in response to a left hand turn to maintain the driver's seat and controls on a horizontal plane feelings to the driver.

An endless chain and a pair of gears to increase torque of the servo-motor including an upper gear and a lower gear engage the endless chain with the upper gear operatively connected to the servo-motor while the lower gear is operatively connected to the tiltable frame or cockpit wherein the movement of the servo-motor to the right will rotate the tiltable frame to the left and movement of the servo-motor to the left will rotate the tiltable frame to the right. In addition, in case of servo-motor failure, a FAIL-SAFE first coil spring biases the tilted frame to the right in response to a left-hand turn and a second coil spring biases the tilted frame to the left in response to a right-hand turn. Finally, an electronically controlled shock absorber for damping or holding movement of the tilting frame is provided to perfecting a FAIL-SAFE operation of coil spring.

The invention will now be described in connection with the accompanying figures wherein like reference numbers are used to indicate like parts.

DESCRIPTION OF THE DRAWINGS

FIG. 6 is a schematic illustration of a tiltable frame assembly of an anti-roll device that is rotatable about a central longitudinal axis to maintain a driver's seat on a generally horizontal plane with a compensating mechanism in a neutral position;

FIG. 7 is a schematic illustration of the mechanism shown in FIG. 6 but with the compensating springs in a neutral position;

FIG. 8 is a schematic illustration of the mechanism shown in FIGS. 6 and 7 but with the servo motor rotated to the right and the tiltable frame or cockpit floor tilted to the left;

DESCRIPTION OF THE PREFERRED EMBODIMENTS OF THE INVENTION

Figure 1:
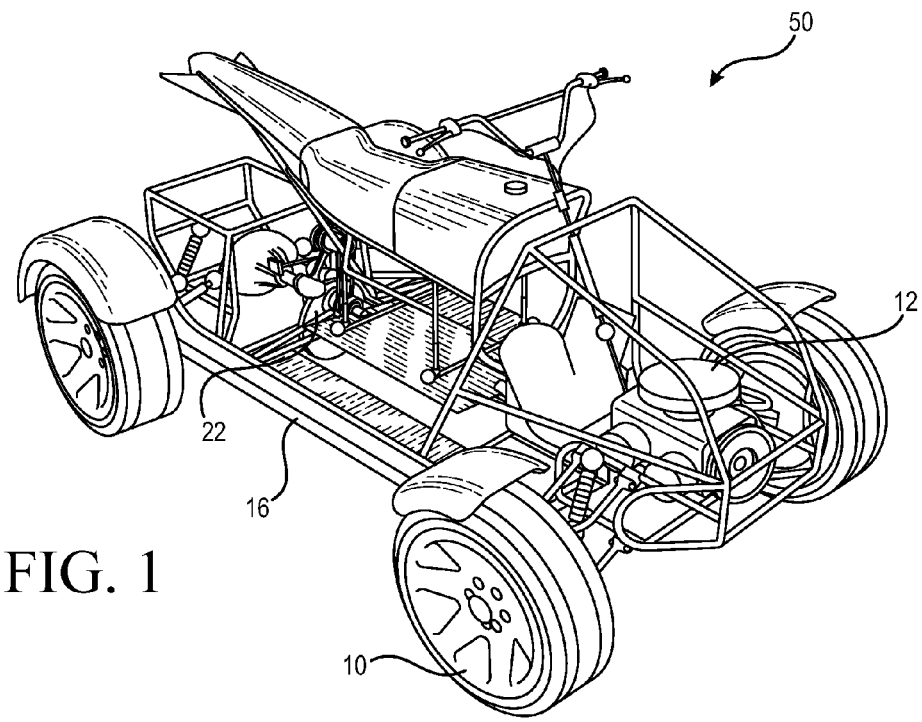
FIG. 1 is a schematic illustration of a motor vehicle that incorporates a rotatable tiltable frame in accordance with the present invention.
Figure 5:
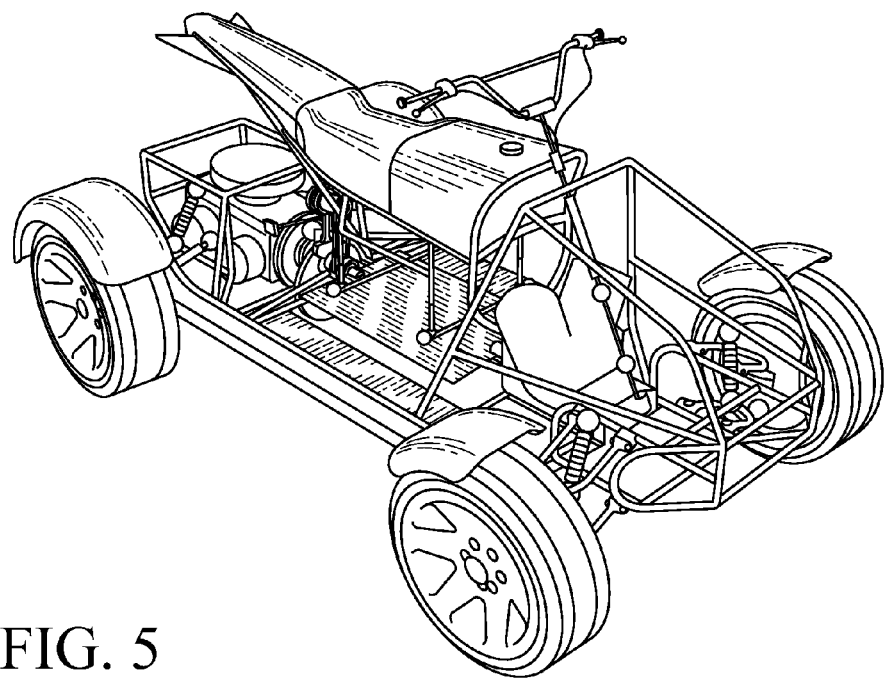
FIG. 5 is a schematic illustration of a motor vehicle shown in FIG. 1 but with the motor removed.

In the preferred embodiment of the invention, a motor vehicle FIGS. 1 and 5 includes an anti-rollover system having an electronic control system and a plurality of sensors as well as a high torque servo-motor for maintaining a rotatable tiltable frame 13 on a generally horizontal plane for the driver and in reality it rotates clockwise in a left turn and counter-clockwise in a right turn due to a g-sensor. It should be recognized that the present invention is also applicable for use in other motor vehicles just as those used for street use as well as on or off road three-wheel vehicles.

As illustrated in FIG. 1, a conventional four wheel off-road or on-road vehicle 10 includes a motor 12, four wheels 14, a supporting frame 16, an upper tubular frame assembly 18, a rider's seat 13', and gas tank 15 as well as other items commonly found on off-road and on-road vehicles. It should be recognized that the present invention is also applicable for use in other motor vehicles such as three-wheel vehicles.

An important aspect of the present invention resides in a self-regulating module that includes a rotatable tiltable frame 13 that carries a rider's seat. The controls are on the handle bars/steering as in a motorcycle as in FIG. 2 or cockpit as in FIG. 1 while instruments may be displayed in a fixed dashboard supported by the tiltable frame 13. The tiltable frame 13 is preferably made of a very light material such as carbon fibers or the like. This element is schematically illustrated in FIGS. 2, 3, 4, 6 and 8. A key element of the present invention is the driver's module or tiltable frame 13 illustrated by a flat plate like floor of a cockpit (FIG. 1) that is rotatable on a central longitudinally extending axis. The fixed frame member 16 (FIG. 1) is preferably of a conventional tubular design and supports the tiltable frame 13.

Figure 2:
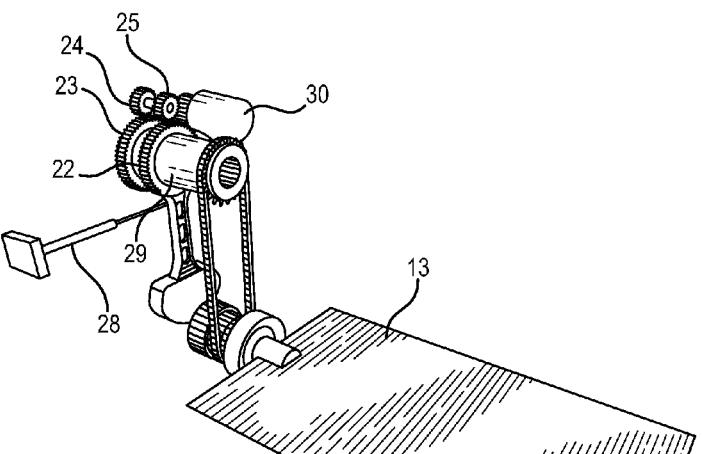
FIG. 2 is a schematic illustration of a tiltable frame assembly with the tiltable frame in a neutral or non-tilted position.
Figure 3:
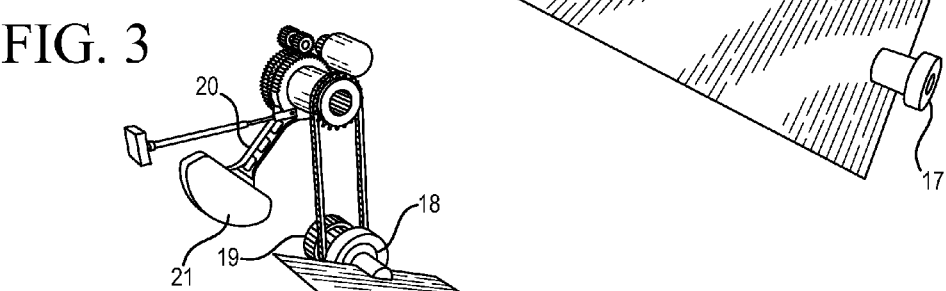
FIG. 3 is a schematic illustration of a tiltable cockpit or frame as shown in FIG. 2 wherein the floor assembly is rotated to the right about a central longitudinal axis to maintain the driver's seat on a generally horizontal plane notwithstanding a rapid sharp turn.
Figure 4:
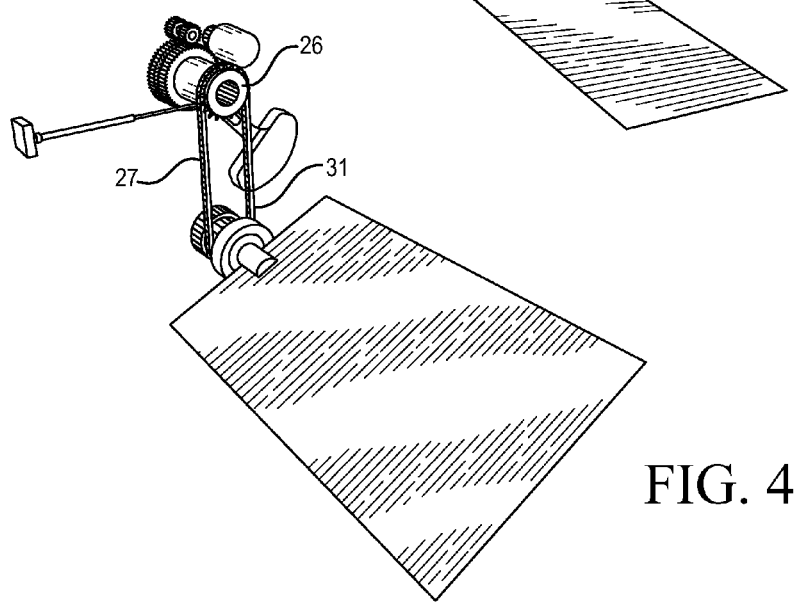
FIG. 4 is a schematic illustration of a mechanism shown in FIG. 3 but with a tiltable frame tilted to the left with a forward part thereof in a lowered position.

As illustrated in FIGS. 2-4 the plate like floor or frame 13 is disposed between two rotatable hubs 17 and 18 one end of the member 13 is fixed to the hub 17 and the other end to the hub 18. In a preferred embodiment of the invention, the tiltable frame is rotatable or tiltable on ball bearing races within hubs 17 and 18. As shown in FIGS. 6 and 8 an endless chain 27 is connected to a lower sprocket 31 and an upper sprocket 26. The upper sprocket 26 is rotated to the left or right by a servo-motor 30 (FIG. 9) that is connected to the upper sprocket 26 by torque gears 22, 23, 24 and 25 (FIG. 10).

As shown in FIG. 2, the tilting frame 13 is in a normal position when the motor vehicle is tracking along a straight line on a horizontal plane. As shown in FIG. 3, the tilting frame 13 has been rotated to the right in response to a relatively hard left turn. And as shown in FIG. 4, the tilting frame 13 has been rotated to the left in response to a relatively hard right turn. As a result, it is rotated to maintain the tiltable frame 13 in a generally horizontal plane for the driver. This shifts more weight to the inner side of the turn to reduce the likelihood of a roll-over.

Referring again to FIGS. 6-8, an electronically controlled shock absorber 28 is fixed to the gear 22. The shock absorber is used to damp and hold the movement of tilting frame 13 in case the servo-motor 30 controlling fails to let coil springs 35 and 36 return tilting frame 13 to a neutral position. However, the primary purpose of the tilting-frame is to prevent or reduce the likelihood of a driver from being thrown off or out of the vehicle by providing a relatively stable position for the driver and controls.

Referring now to FIGS. 6-8, the rotatable tiltable frame 13 is disposed between the rotatable hubs 17 and 18 and rotatable on ball bearing races moved by the endless chain 27 in response to the electronic control system and/or servo-motor 30.

An important feature of one embodiment of the invention resides in a pair of coil springs 35 and 36 that bias the driver's seat 13' to the right and the left. In FIG. 6, the tiltable floor or frame 13 is shown in a neutral position while the upper sprocket 26 and lower sprocket 31 are connected by chain 27. The coil springs 35 and 36 are wrapped around the drum 33 and 34 in opposite directions and balance one another when the floor or tiltable frame is in a neutral position as shown in FIG. 6.

When the servo-motor (FIGS. 6-8) tilts the tilting-frame to the right or left due to a left or right turn, one of the spiral springs will increase its force on the rotator of the tiltable floor 13 in one direction while taking an opposite turn will tilt the floor in an opposite direction as will be understood by persons of ordinary skill in the art.

Figure 9:
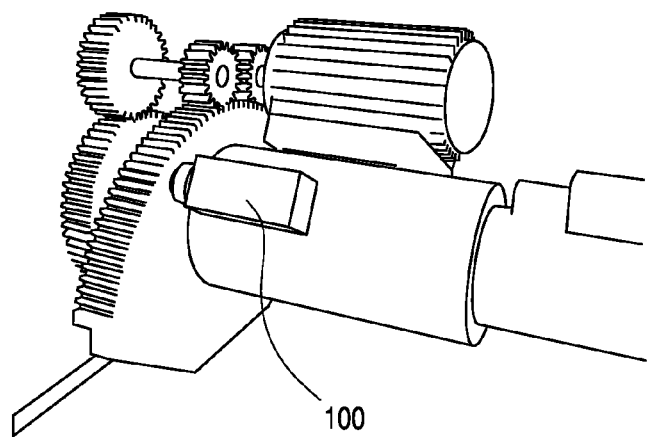
FIG. 9 is a schematic illustration illustrating a fail-safe mechanism in accordance with the present invention.
Figure 10:
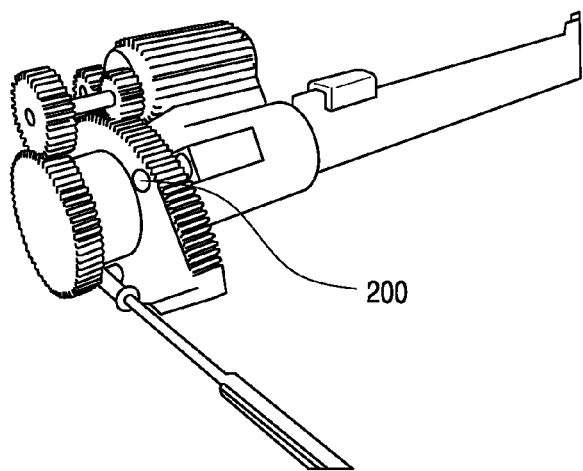
FIG. 10 is a schematic illustration of the fail-safe mechanism shown in FIG. 9.

In a preferred embodiment of the invention the anti-rollover device includes a multi fail-safe subsystem as illustrated in FIGS. 9 and 10. As shown in FIGS. 9 and 10, a power unit 100 locks or unlocks the system in a fail-safe arrangement. The system includes a pin or rod that is inserted into a passage 200 (FIG. 10) to lock a series of gears in a neutral or inoperative position as will be well understood by persons of ordinary skill in the art.

Examples of suitable sensors are high precision micro electro mechanical systems (MEM) sensors such as STIM 300 available from Sensonor, a leading manufacturer of gyro and pressure products that provide global customers with such products.

It is also contemplated that for improved stability, relatively wide street type of tires are used in place of motorcycle tires (FIG. 2) and the vehicle is constructed with a lower center of gravity. In addition, in a preferred embodiment the system includes a fail-safe system to lock the tiltable frame in a fixed position with respect to the main frame.

While the invention has been described in connection with its accompanying drawing, it should be recognized that changes and modifications may be made therein without departing from the scope of the appended claims.

What is claimed is:

1. A motor vehicle having an anti-rollover device, said motor vehicle comprising:
   a motor, a plurality of wheels including a pair of driven wheels driven by said motor;
   a longitudinally extending main frame and a plurality of springs supporting said main frame above said wheels;
   a pair of centrally disposed rotatable hubs aligned along a longitudinally extending axis with one of said rotatable hubs disposed on a forward part of said frame and the second of said rotatable hubs disposed on an aft part of said frame;

a rotatable tiltable frame including a driver's seat, handle bars and controls disposed between said rotatable hubs and rotatable to a limited degree to the right in response to a left-hand turn and to the left in response to a right-hand turn;

an electronic control system disposed on said main frame constructed and arranged to rotate or tilt said tiltable frame in a counterclockwise direction in response to a right hand turn and in a clockwise direction in response to a left hand turn to maintain said driver's seat on a generally horizontal plane;

a first coil spring biasing a tiltable plate to the right in response to left-hand turns and a second coil spring for biasing said tiltable plate to the left in response to a right-hand turn; and a shock absorber for dampening movement of said system.

2. A motor vehicle having an anti-rollover device according to claim 1, which includes a longitudinally extending shaft between said hubs and a ball bearing suspension for rotation of said shaft in said hubs.

3. A motor vehicle having an anti-rollover device according to claim 1, in which said tiltable plate is a lightweight floor assembly made of carbon fiber material.

4. A motor vehicle having an anti-rollover device, said motor vehicle consisting of:

a motor, a plurality of wheels including a pair of driven wheels driven by said motor;

a longitudinally extending main frame and a plurality of springs supporting said main frame above said wheels;

a pair of centrally disposed rotatable hubs aligned along a longitudinally extending axis with one of said rotatable hubs disposed on a forward part of said frame and the second of said rotatable hubs disposed on an aft part of said frame;

a rotatable tiltable plate disposed between said rotatable hubs and rotatable to a limited degree to the right in response to a left-hand turn and to the left in response to a right-hand turn;

a weighted pendulum disposed on said main frame and said pendulum constructed and arranged to swing to the right in response to a left-hand turn and to the left in response to a right-hand turn;

an endless chain and a pair of gears including an upper gear and a lower gear engaging said endless chain with said upper gear operatively connected to said pendulum and said lower gear operatively connected to said tiltable plate wherein movement of said pendulum to the right will rotate said tiltable plate to the left and rotate said tiltable plate to the right;

a first coil spring biasing said tiltable plate to the right in response to left-hand turns and a second coil spring for biasing said tiltable plate to the left in response to a right-hand turn; and a shock absorber for dampening movement of said pendulum is provided.

5. A motor vehicle having an anti-rollover device according to claim 4, in which said shock absorber is mounted to said main frame and at an opposite end to said pendulum.

6. A motor vehicle having an anti-rollover device according to claim 4, in which said gear assembly drives a weight to the left or right.

7. A motor vehicle having an anti-rollover device according to claim 2, which includes a fail-safe system wherein said tiltable frame is fixed with respect to said main frame.

* * * * *